(12) United States Patent
Sato

(10) Patent No.: US 12,126,778 B2
(45) Date of Patent: Oct. 22, 2024

(54) IMAGE FORMING APPARATUS

(71) Applicant: Toshiba Tec Kabushiki Kaisha, Tokyo (JP)

(72) Inventor: Yoji Sato, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/327,034

(22) Filed: May 31, 2023

(65) Prior Publication Data

US 2024/0137453 A1 Apr. 25, 2024
US 2024/0236253 A9 Jul. 11, 2024

(30) Foreign Application Priority Data

Oct. 19, 2022 (JP) ................... 2022-167579

(51) Int. Cl.
*H04N 1/32* (2006.01)
*H04N 1/60* (2006.01)

(52) U.S. Cl.
CPC ..... *H04N 1/32347* (2013.01); *H04N 1/32523* (2013.01); *H04N 1/6091* (2013.01)

(58) Field of Classification Search
CPC .................................................. H04N 1/32347
See application file for complete search history.

(56) References Cited

U.S. PATENT DOCUMENTS

| | | | | |
|---|---|---|---|---|
| 8,194,917 B2 * | 6/2012 | Tian | ................... | H04N 1/32347 382/100 |
| 10,303,096 B1 * | 5/2019 | Kawaguchi | ........... | G06F 3/1242 |
| 10,474,081 B1 * | 11/2019 | Yamada | ............... | G03G 15/221 |
| 2003/0179900 A1 * | 9/2003 | Tian | ................... | H04N 1/32304 382/100 |
| 2003/0179901 A1 * | 9/2003 | Tian | ..................... | H04N 1/3232 382/100 |
| 2004/0001164 A1 * | 1/2004 | Murakami | ......... | H04N 1/32203 348/E5.077 |
| 2006/0125887 A1 * | 6/2006 | Hwang | ................ | B41J 2/17553 347/86 |
| 2010/0254569 A1 * | 10/2010 | Vial | ................... | H04N 1/32304 382/100 |
| 2011/0267632 A1 * | 11/2011 | Wu | .......................... | B41J 11/46 358/1.9 |

(Continued)

FOREIGN PATENT DOCUMENTS

JP 2018162081 A * 10/2018
JP 2021139670 A * 9/2021

(Continued)

*Primary Examiner* — Ted W Barnes
(74) *Attorney, Agent, or Firm* — Kim & Stewart LLP

(57) ABSTRACT

An image forming apparatus includes a first printer configured to print on a medium using a first material, a second printer configured to print on the medium using a second material that turns invisible when a first condition is satisfied, and a controller configured to: control the first printer to print on the medium a first symbol that is machine-readable and associated with first information, and control the second printer to print a second symbol on the medium on which the first symbol has been printed. A composite symbol of the first and second symbols is machine-readable and associated with second information different from the first information.

18 Claims, 10 Drawing Sheets

(56) References Cited

U.S. PATENT DOCUMENTS

| | | | | |
|---|---|---|---|---|
| 2012/0099152 A1* | 4/2012 | Kamata | ............... | H04N 1/00689 |
| | | | | 358/1.15 |
| 2012/0327481 A1* | 12/2012 | Yamauchi | ............. | G03G 9/0928 |
| | | | | 358/3.28 |
| 2015/0124270 A1* | 5/2015 | Megawa | ............... | H04N 1/4473 |
| | | | | 358/1.9 |
| 2016/0088192 A1* | 3/2016 | Mizuno | ................... | H04N 1/60 |
| | | | | 358/1.9 |
| 2016/0148088 A1* | 5/2016 | Boday | ............... | G06K 19/0614 |
| | | | | 235/488 |
| 2016/0379096 A1* | 12/2016 | Hakamada | ............... | B41J 3/543 |
| | | | | 358/1.4 |
| 2017/0182810 A1* | 6/2017 | Inoue | ...................... | B41J 13/28 |
| 2017/0339301 A1* | 11/2017 | Pjanic | .................... | H04N 1/405 |
| 2018/0025185 A1* | 1/2018 | Hattrup | ............... | G06K 15/1859 |
| | | | | 705/14.1 |
| 2018/0309899 A1* | 10/2018 | Kurosawa | ............... | G03G 21/04 |
| 2019/0075219 A1* | 3/2019 | Hiyoshi | ................ | H04N 1/444 |
| 2019/0095153 A1* | 3/2019 | Akiyama | ........... | H04N 1/32144 |
| 2019/0297227 A1* | 9/2019 | Hiyoshi | ............... | B41M 7/0009 |
| 2019/0390314 A1 | 12/2019 | Koba et al. | | |
| 2020/0406664 A1* | 12/2020 | Munoz Utiel | ..... | H04N 1/32347 |
| 2020/0412908 A1* | 12/2020 | Kobayashi | ......... | H04N 1/32101 |
| 2023/0081902 A1* | 3/2023 | Nomura | ............... | G03G 15/234 |
| | | | | 358/1.1 |

FOREIGN PATENT DOCUMENTS

| | | | | |
|---|---|---|---|---|
| JP | 2023033142 A | * | 3/2023 | |
| WO | WO-2021175445 A1 | * | 9/2021 | ............... G01K 3/04 |

* cited by examiner

IMAGE FORMING APPARATUS

CROSS-REFERENCE TO RELATED APPLICATION(S)

This application is based upon and claims the benefit of priority from Japanese Patent Application No. 2022-167579, filed Oct. 19, 2022, the entire contents of which are incorporated herein by reference.

FIELD

Embodiments described herein relate generally to an image forming apparatus and a printing medium.

BACKGROUND

A conventional printed material displays the same, predetermined information, such as a two-dimensional code. The conventional printed material is insufficient to meet the needs of current applications because the current applications require it to be adaptable to provide information suitable for a situation.

SUMMARY OF THE INVENTION

Embodiments of the present invention provide a printed material capable of displaying an image that changes depending on conditions, and an image forming apparatus capable of producing the printed material.

According to an embodiment, an image forming apparatus includes a first printer configured to print on a medium using a first material, a second printer configured to print on the medium using a second material that turns invisible when a first condition is satisfied, and a controller configured to: control the first printer to print on the medium a first symbol that is machine-readable and associated with first information, and control the second printer to print a second symbol on the medium on which the first symbol has been printed. A composite symbol of the first and second symbols is machine-readable and associated with second information different from the first information.

DETAILED DESCRIPTION

Hereinafter, embodiments will be described with reference to the drawings.

First, a printed material A of a first example will be described.

Figure 1:
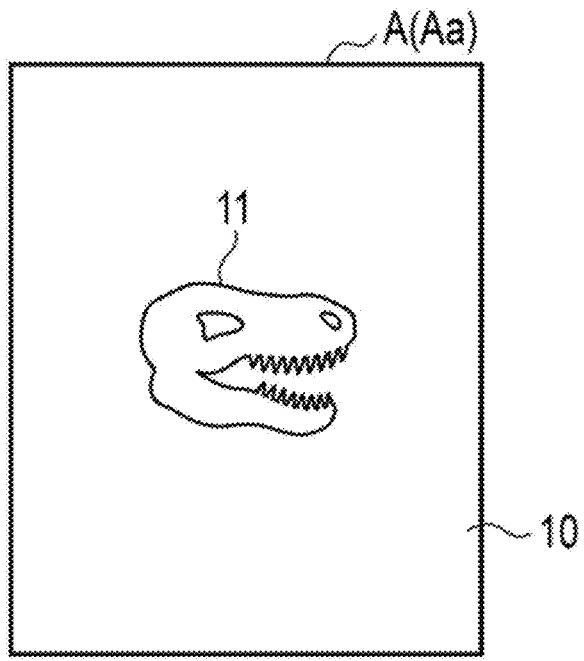
FIG. 1 is a diagram illustrating a printed material of a first example on which a first image is visible.
Figure 2:
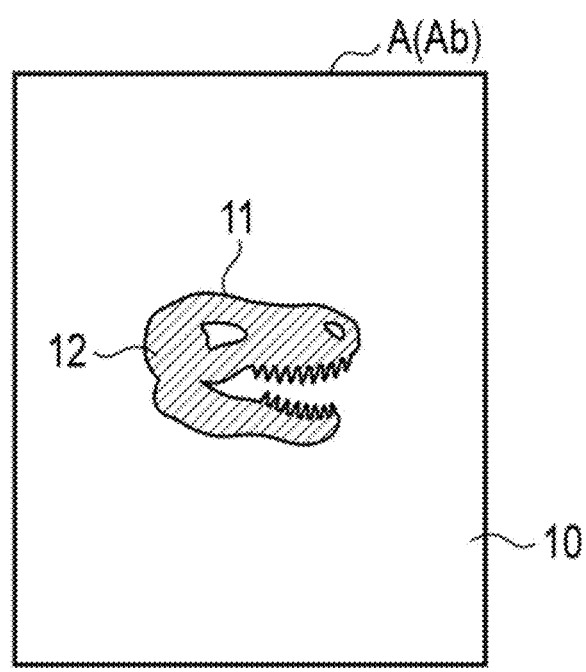
FIG. 2 is a diagram illustrating the printed material of the first example on which first and second images are visible.

FIG. 1 and FIG. 2 are diagrams illustrating the printed material A. In the printed material A illustrated in FIGS. 1 and 2, an image that is visible varies depending on the conditions. FIG. 1 is a diagram illustrating a first state of the printed material Aa in which a first image 11 is visible and thus machine-readable, whereas a second image 12 is not visible. FIG. 2 is a diagram illustrating a second state of the printed material Ab in which the first image 11 and the second image 12 are both visible and machine-readable.

As shown in FIG. 2, the printed material A has a substrate or base medium 10, the first image 11, and the second image 12. The first image 11 is formed of a first image forming material (hereinafter referred to as the first material). The second image 12 is formed of a second image forming material (hereinafter referred to as the second material). The substrate 10 is a medium that holds the first image 11 formed of the first material and the second image 12 formed of the second material.

The second material forming the second image 12 is in the invisible state and thus is not machine readable under a predetermined condition. It is also assumed that the second material can return to the visible state when it is no longer under the predetermined condition. The first material forming the first image 11 is in the visible state even under the predetermined condition in which the second material is invisible.

In the following description, it is assumed that the second material forming the second image 12 is an image forming material that is decolored when a decoloring condition (hereinafter also referred to as a first condition) as the predetermined condition is satisfied. In addition, in the printed material A, the first material forming the first image 11 is an image forming material that is not decolored even under the decoloring condition. In the following description, decoloring means that changing the state of an image to the invisible state. Decoloring includes changing the color of an image a particular color that is invisible to a human.

As the second material, an image forming material which is decolored under various decoloring conditions can be used. For example, the second material may be an image forming material that is decolored due to temperature or the like. The second material that is decolored by the temperature changes from the colored state (i.e., the visible state) to the decolored state (i.e., the invisible state) when the temperature of the environment in which the printed material is placed becomes equal to or higher than a predetermined temperature.

The second material is, for example, a thermochromic ink or decolorable toner to which a leuco dye is added. The color of the thermochromic ink or toner disappears at a predetermined decoloring temperature or higher, and becomes invisible or transparent to naked eyes. In addition, the thermochromic ink or toner becomes visible again due to a decrease in temperature.

In addition, the material that can be used as the second material that is decolorable depending on the conditions is not limited to the material that is decolorable depending on the temperature. For example, the second material may be decolored or colored when wet with water.

In the printed material A, the substrate 10 has a printing surface on which the first image 11 and the second image 12 can be printed. The substrate 10 may include any surface capable of holding the first material for forming the first image 11 and the second material for forming the second image 12. The substrate 10 is not limited to paper or the like, and may be any object having a printing surface formed of a material on which the first image 11 and the second image 12 can be printed. Further, the substrate 10 is not limited to a print medium such as paper, and may be any object having a printing surface on which the first image 11 and the second image 12 can be printed, such as a box, a wall, a column, or a floor.

In the printed material A, the first image 11 formed of the first material and the second image 12 formed of the second material are printed on the substrate 10. The first image 11 indicates first information. A composite image obtained by combining the second image 12 and the first image 11 indicates second information different from the first information indicated by the first image. The second image 12 may be printed as a difference image between the first image 11 and the composite image, or may be printed on top of the first image 11.

It is assumed that the first image 11 printed on the printed material Aa shown in FIG. 1 is a first AR (Augmented Reality) marker indicating a first content as the first information. It is assumed that the composite image of the first image 11 and the second image 12 printed on the printed material Ab shown in FIG. 2 is a second AR marker indicating a second content as the second information.

Here, the AR marker is an image for causing an information processing apparatus that executes a particular video display program (hereinafter, also referred to as an AR application) to display a specific content. The first AR marker causes the information processing apparatus that executes the AR application to display the first content. The second AR marker causes the information processing apparatus to display the second content. The AR marker will be described later.

FIG. 1 is a diagram illustrating the printed material Aa in a state where the second material is decolored under the decoloring condition satisfied on the substrate 10.

In the printed material Aa in a state where the decoloring condition is satisfied, the second image 12 on the substrate 10 is in the invisible state (i.e., the decolored state) because the second material is decolored. Further, since the first material is not decolored even in the state where the decoloring condition is satisfied, the first image 11 on the substrate 10 is in the visible state. Therefore, as shown in FIG. 1, only the first image 11 is visible and machine-readable and the second image 12 is not visible.

FIG. 2 is a diagram illustrating the printed material Ab of the substrate 10 in which the second material is not decolored.

In the printed material Ab in a state in which the decoloring condition is not satisfied, the second image 12 on the substrate 10 is in the visible state (i.e., colored state) because the second material is not decolored. Therefore, in the printed material Ab in the state in which the decoloring condition is not satisfied, the first image 11 and the second image 12 are both in the visible state and machine-readable, as shown in FIG. 2. Consequently, the printed material Ab shown in FIG. 2 shows the composite image of the first image 11 and the second image 12.

As shown in FIGS. 1 and 2, in the printed material A, an image that can be visually recognized changes depending on whether the decoloring condition is satisfied for the second material to be decolored. The printed material Aa in a state where the decoloring condition is satisfied shows only the first image 11 in the visible state. The printed material Ab in a state in which the decoloring condition is not satisfied shows a composite image in which the first image 11 and the second image 12 are combined in the visible state.

The second material forming the second image 12 may be a reversible material that reversibly changes between the visible state and the invisible state depending on whether the decoloring condition is satisfied. If the second material is a reversible material, the second image 12 may be invisible when the decoloring condition is not satisfied and visible when the decoloring condition is satisfied. For example, if the second material is a reversible material that is decolored at a predetermined decoloring temperature or higher, the second image may be in the visible state at the predetermined decoloring temperature or higher, and may be in the invisible state below the predetermined decoloring temperature.

Next, an operation example of the first image 11 and the second image 12 to be printed on the printed material A of the first example will be described.

Figure 3:
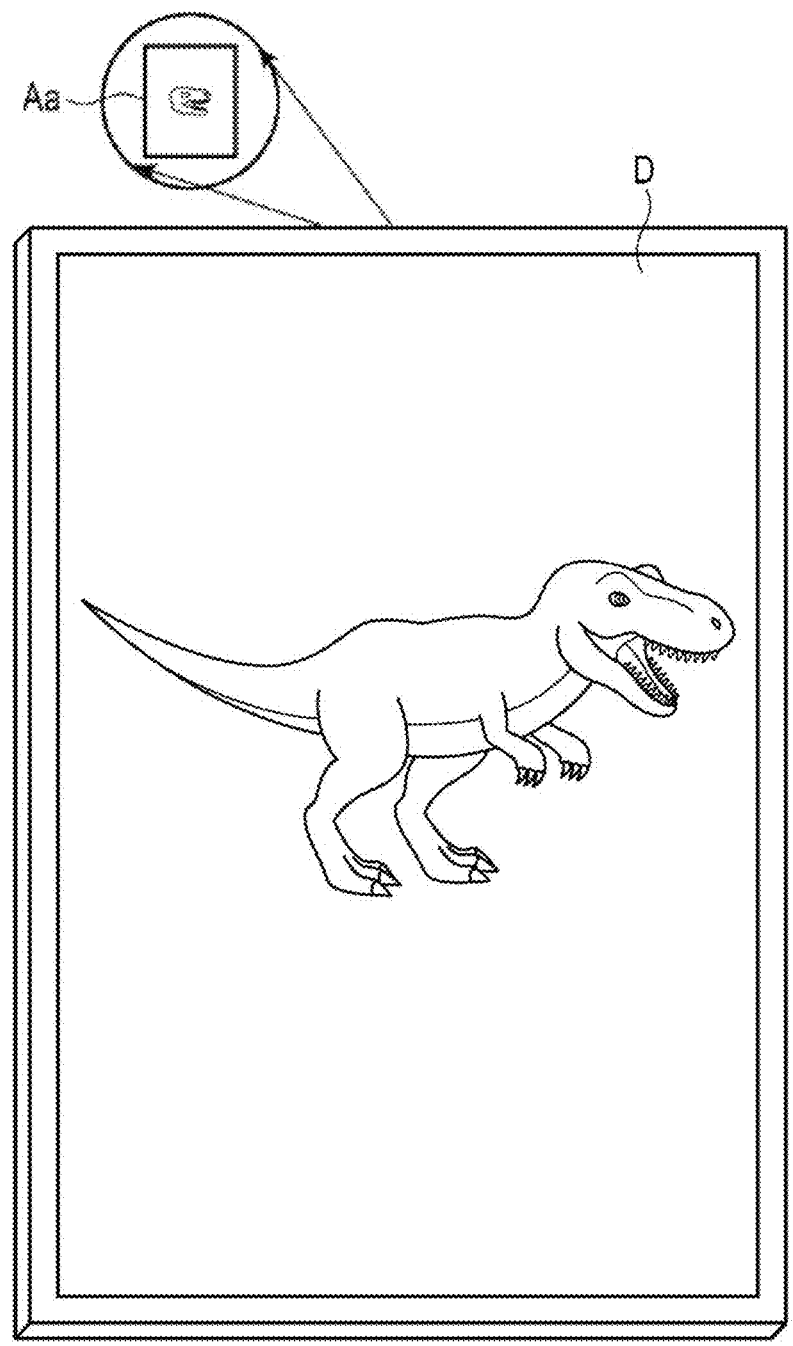
FIG. 3 is a diagram illustrating a screen of an information processing apparatus that has read the first and second images on the printed material shown in FIG. 2.
Figure 4:
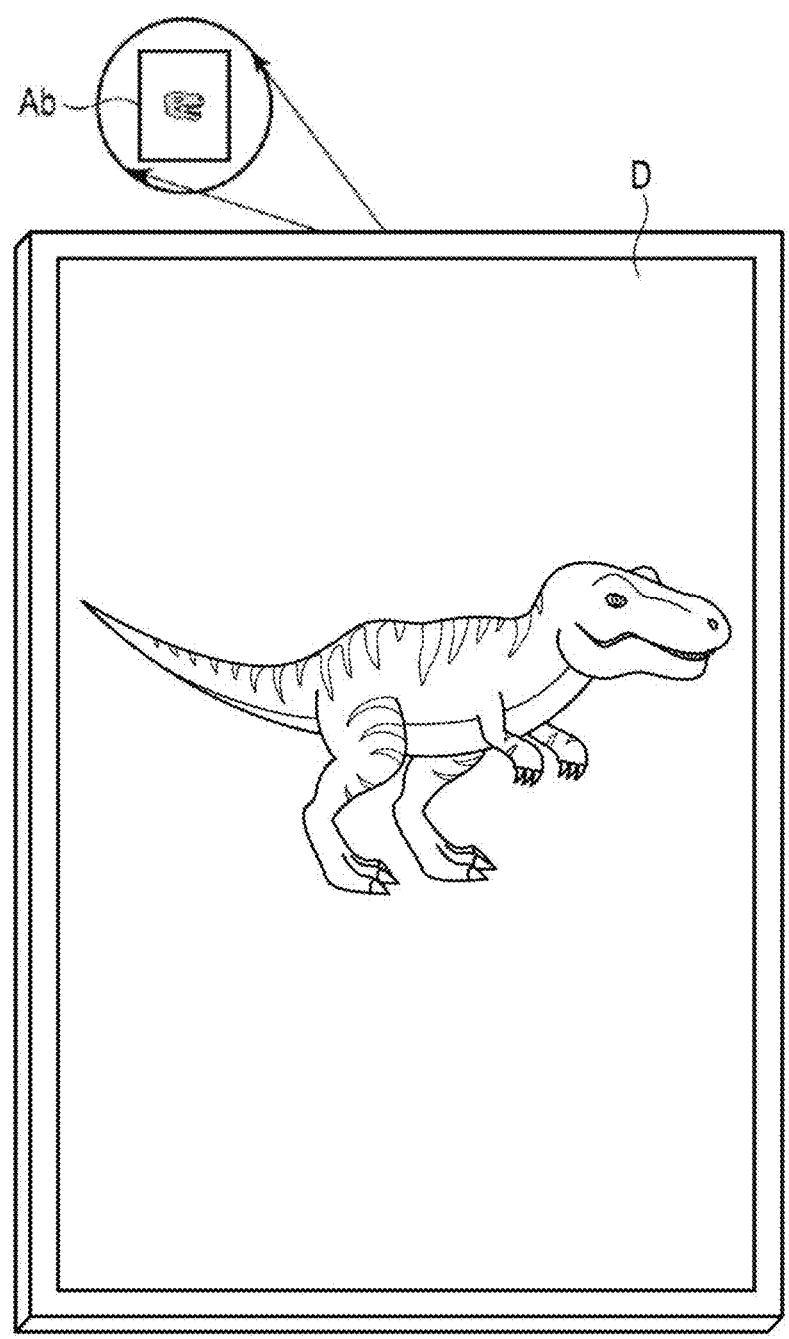
FIG. 4 is a diagram illustrating a screen of an information processing apparatus that has read the first image on the printed material shown in FIG. 1.

FIG. 3 and FIG. 4 are diagrams for explaining how a plurality of AR markers work corresponding to a plurality of types of visible images on the printed material A depending on the conditions.

The AR marker is an image associated with a particular content. AR is a technique of superimposing and displaying digital contents on a real image displayed on a display device. The AR marker is a trigger for displaying a particular content to be displayed as an AR object.

An information processing apparatus D can acquire and display contents associated with images set as AR markers by executing a particular video display program (i.e., an AR application). The AR application is an application program that acquires the content data associated with the input image. For example, the AR application is installed in an information processing apparatus D including a camera and a display device (for example, a smart phone, a tablet PC, a smart glass, or the like).

The information processing apparatus D activates the AR application and captures an image of an AR marker by the camera. The information processing apparatus D calculates a feature amount from the image of the AR marker captured by the camera, and acquires the corresponding content data associated with the feature amount. The information processing apparatus D displays the content on the display device over the image captured by the camera.

FIG. 3 is a schematic diagram illustrating an exemplary first content displayed by the information processing apparatus D that reads the image visible on the printed material Aa illustrated in FIG. 1 as the AR marker.

The first image 11 visible on the printed material Aa shown in FIG. 1 is set as the AR marker associated with the first content shown in FIG. 3 (hereinafter referred to as the first AR marker). As shown in FIG. 1, in the printed material Aa under the decoloring condition in which the second material is decolored, the first image 11 is visible and the second image is not visible. The information processing apparatus D reads the first image 11, which is the first AR marker, when the printed material Aa under the decoloring condition is captured by the camera. When the first image 11 is read from the printed material Aa, the information processing apparatus D displays the first content associated with the first image 11, which is the first AR marker, as shown in FIG. 3.

FIG. 4 is a schematic diagram illustrating an exemplary second content displayed by the information processing apparatus D that reads the image visible on the printed material Ab illustrated in FIG. 2 as the AR marker.

It is assumed that the composite image of the first image 11 and the second image 12 visible on the printed material Ab shown in FIG. 2 is set as the AR marker associated with the second content shown in FIG. 4 (hereinafter referred to as the second AR marker). As shown in FIG. 2, in the printed material Ab in a state in which the second material is not decolored (i.e., the decoloring condition is not satisfied), the first image 11 and the second image 12 are visible. When the printed material Ab is captured by the camera under the decoloring condition unsatisfied, the information processing apparatus D reads the composite image of the first image 11 and the second image 12, which is the second AR marker. When the composite image of the first image and the second image is read from the printed material Ab, the information processing apparatus D displays the second content associated with the composite image, as illustrated in FIG. 4, which is different from the first content.

As described above, a plurality of images set as a plurality of different AR markers are visible on the printed material A according to the conditions. In other words, the visible AR marker can be changed according to the conditions. According to the above-described example, the first AR marker is visible on the printed material A when the decoloring condition is satisfied, and the second AR marker is visible when the decoloring condition is not satisfied. The information processing apparatus D in which the AR application operates can display different contents by reading the printed material A in the states where the decoloring condition is and is not satisfied.

That is, the information processing apparatus D can display the first content associated with an image other than the image formed of the material to be decolored if the decoloring condition is satisfied. The information processing apparatus D can display the second content associated with the image including the image formed of the material to be decolored if the decoloring condition is not satisfied.

Next, a printed material B of a second example will be described.

Figure 5:
FIG. 5 is a diagram illustrating a printed material of a second example on which a first image pattern is visible.
Figure 6:
FIG. 6 is a diagram illustrating the printed material of the second example on which a second image pattern is visible.

FIG. 5 is a diagram illustrating an example of a first image pattern Pa to be printed on the printed material B. FIG. 6 is a diagram illustrating an example of a second image pattern Pb to be printed on the printed material B.

The first image pattern Pa illustrated in FIG. 5 is a two-dimensional code indicating particular character information (hereinafter referred to as the first information). The second image pattern Pb illustrated in FIG. 6 is a two-dimensional code indicating information different from the first image pattern (hereinafter referred to as the second information). The first image pattern Pa and the second image pattern Pb have the same size and include a common pattern (hereinafter also referred to as a common image). For example, if the first image pattern Pa and the second image pattern Pb are image patterns created in accordance with a predetermined standard, the size of the common image increases.

Figure 8:
FIG. 8 is a diagram illustrating the printed material of the second example on which the common image and a second image are visible.
Figure 9:
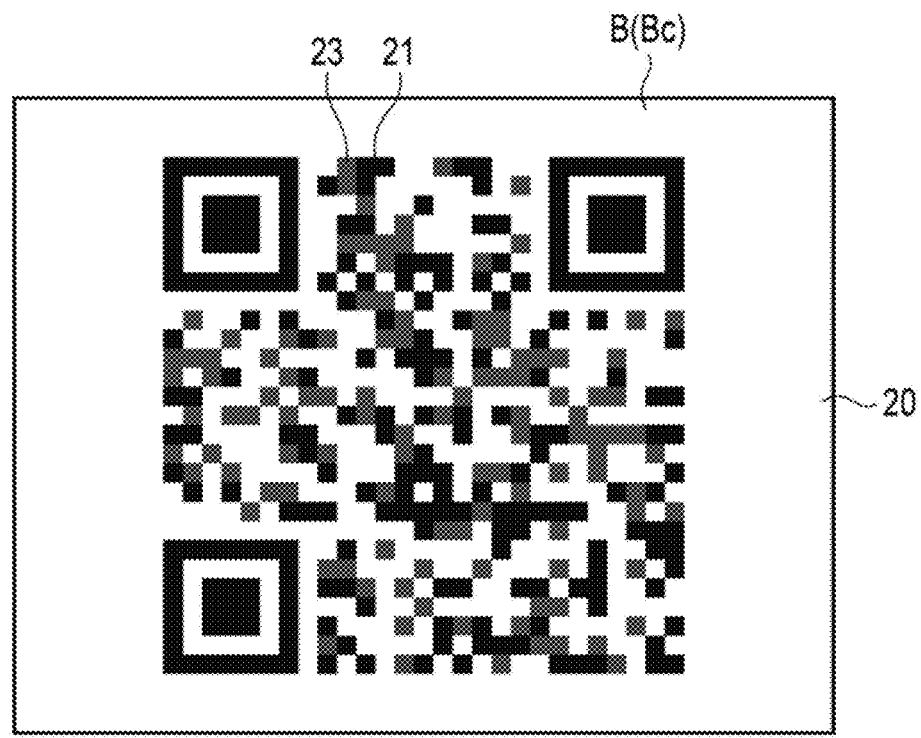
FIG. 9 is a diagram illustrating the printed material of the second example on which the common image and a third image are visible.
Figure 10:
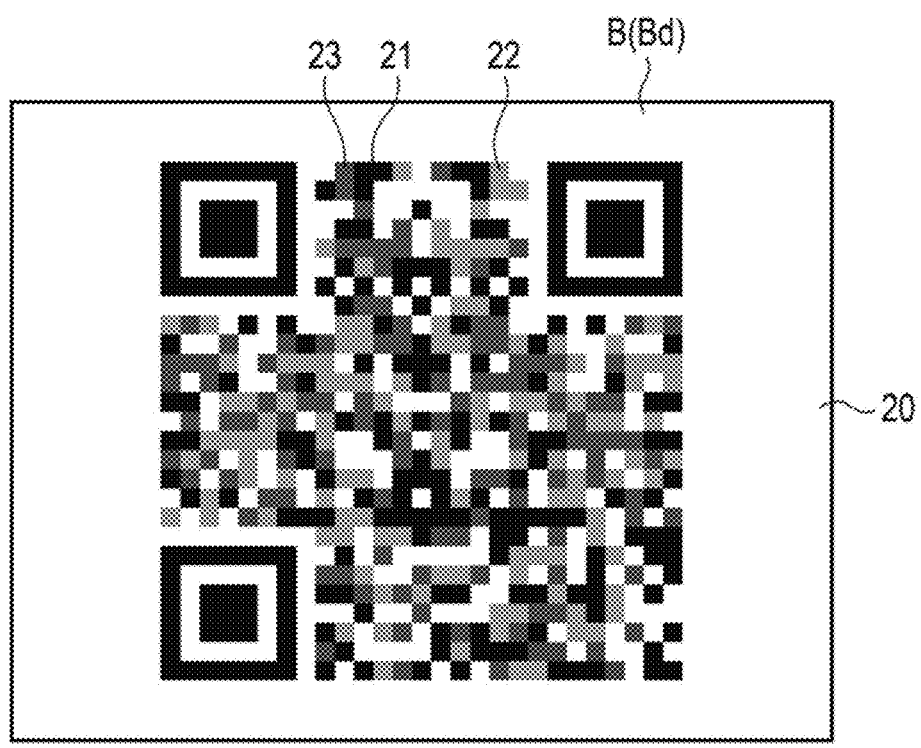
FIG. 10 is a diagram illustrating the printed material of the second example on which the common image, the second image, and the third image are visible.

FIG. 7 to FIG. 10 are diagrams illustrating the printed material B of the second example. In the printed material B illustrated in FIGS. 7 to 10, the first image pattern Pa and the second image pattern Pb are superimposed on each other and printed on a substrate or medium 20 using a plurality of image forming materials. As shown in FIG. 10, the printed material B has the substrate 20, a common image 21 (hereinafter referred to as a first image), a second image 22, and a third image 23.

The substrate 20 is a medium that holds the common image (i.e., the first image) 21, the second image 22, and the third image 23. The substrate 20 has a printing surface on which the common image 21, the second image 22, and the third image 23 can be printed. The substrate 20 includes a printing surface that can hold a first material for forming the common or first image, a second material for forming the second image 22, and a third material for forming the third image 23. The substrate 20 is not limited to paper or the like, and may be any medium having a printing surface formed of a material capable of holding the common image 21, the second image 22, and the third image 23. Further, the substrate 10 is not limited to a medium such as paper, and may be any object having a printing surface on which the first, second, and third images 21-23 can be printed, such as a box, a wall, a column, or a floor.

The common or first image 21 is formed of a first image forming material (hereinafter referred to as a first material). The common image 21 is an image of a common pattern of the first image pattern Pa and the second image pattern Pb. The first material forming the common image 21 is an image forming material that is in the visible state even under the first condition or the second condition described later. For example, the first material is an image forming material that is not discolored and thus is visible even when the conditions change.

The second image 22 is formed of a second image forming material (hereinafter referred to as a second material). In the printed material B, a composite image obtained by combining the second image 22 and the common image 21 forms the first image pattern Pa. The second material forming the second image 22 is in the visible state when a visible condition of the second material is satisfied (hereinafter referred to as the first condition). In addition, the second material has reversibility that becomes visible when the first condition is satisfied, and becomes invisible when the first condition is not satisfied. For example, the second material is an image forming material having reversible discoloration characteristics and developing color when the first condition is met and decolored when the first condition is not met.

The third image 23 is formed of a third image forming material (hereinafter referred to as a third material). In the printed material B, a composite image obtained by combining the third image 23 and the common image 21 forms the second image pattern Pb. The third material forming the third image 23 becomes visible when a visible condition (hereinafter referred to as the second condition) of the third material different from the first condition is satisfied. The third material has a reversibility that is visible when the second condition is satisfied and invisible when the second condition is not satisfied. For example, the third material is an image forming material having reversible discoloration characteristics and developing color when the second condition is satisfied and decolored when the second condition is not satisfied.

In the printed material B, the second image 22 and the third image 23 printed on the substrate 20 change according to the conditions.

Figure 7:
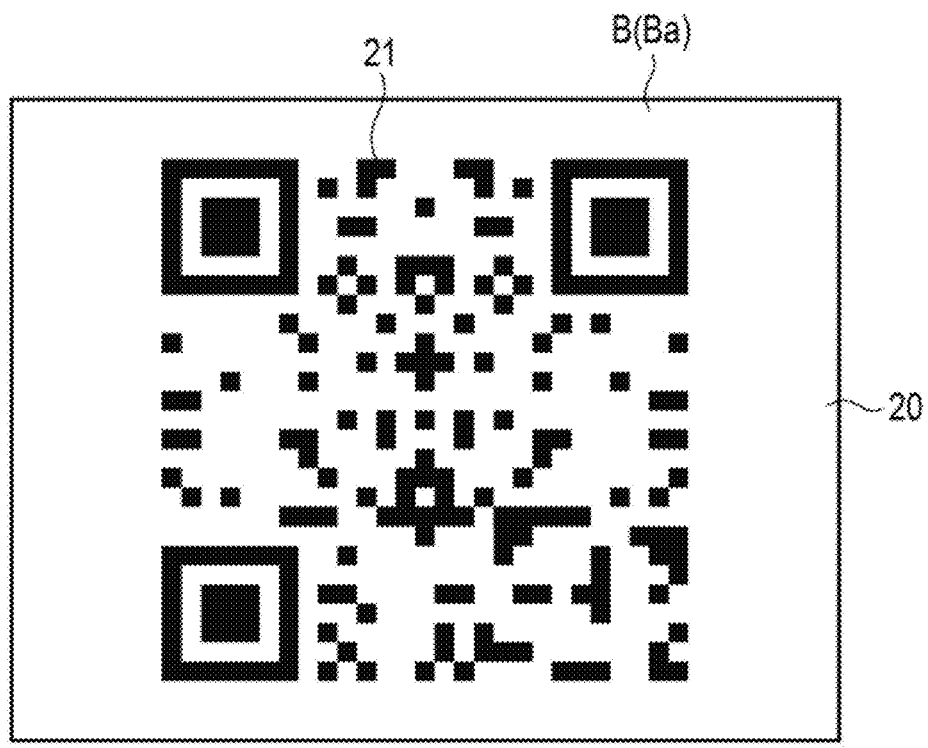
FIG. 7 is a diagram illustrating a printed material of the second example on which a common image is visible.

FIG. 7 is a diagram showing the printed material B (Ba) on which only the common image (i.e., the first image) 21 of the first image pattern Pa and the second image pattern Pb is visible.

When the second image 22 and the third image 23 are both invisible, only the common image 21 is visible as shown in FIG. 7. If the first condition and the second condition are not both satisfied, the second material and the third material are both invisible. That is, when both the first condition and the second condition are not satisfied, only the common image 21 is visible on the printed material B.

FIG. 8 is a diagram illustrating the printed material B (Bb) on which the third image 23 is not visible, and the common image 21 and the second image 22 are visible.

When the second image 22 is in the visible state and the third image 23 is in the invisible state, the common image 21 and the second image 22 are visible as shown in FIG. 8. If the first condition is satisfied and the second condition is not satisfied, the second material is in the visible state and the third material is in the invisible state. That is, when the first condition is satisfied and the second condition is not satisfied, the first image pattern Pa composed of the common image 21 and the second image 22 is visible.

In the printed material B, the common image 21 and the second image 22 printed on the substrate 20 form the first image pattern Pa. The second image 22 illustrated in FIG. 8 corresponds to the first image pattern Pa excluding the common image 21. For example, the second image 22 is printed on the substrate 20 by forming a difference image between the first image pattern Pa and the common image 21 using the second material. The second image 22 may be printed on the substrate 20 by superimposing the first image pattern Pa formed of the second material on the common image 21 formed of the first material.

FIG. 9 is a diagram illustrating the printed material B (Bc) in which the second image 22 is not visible and the common image 21 and the third image 23 are visible.

When the second image 22 is in the invisible state and the third image 23 is in the visible state, the common image 21 and the third image 23 are visible as shown in FIG. 9. If the first condition is not satisfied and the second condition is satisfied, the second material is in the invisible state and the third material is in the visible state. That is, when the first condition is not satisfied and the second condition is satisfied, the printed material B displays the second image pattern Pb composed of the common image 21 and the third image 23.

In the printed material B, the common image 21 and the third image 23 printed on the substrate 20 form the second image pattern Pb. The third image 23 illustrated in FIG. 9 corresponds to the second image pattern Pb excluding the common image 21. For example, the third image 23 is printed on the substrate 20 by forming a difference image between the second image pattern Pb and the common image 21 using the third material. In addition, the third image 23 may be printed on the substrate 20 by printing the second image pattern Pb formed of the third material on the common image 21 formed of the first material.

FIG. 10 is a diagram illustrating the printed material B (Bd) in which the common image 21, the second image 22, and the third image 23 are visible.

When the second image 22 and the third image 23 are visible, all the common image 21, the second image 22, and the third image 23 are visible as shown in FIG. 10. If both the first condition and the second condition are met, both the second material and the third material are visible. That is, when both the first condition and the second condition are satisfied, the common image 21, the second image 22, and the third image 23 are visible on the printed material B.

In the printed material B, the common image 21 and the second image 22 form the first image pattern Pa, and the common image 21 and the third image 23 form the second image pattern Pb. Therefore, in the image visible on the printed material Bd shown in FIG. 10, the first image pattern Pa and the second image pattern Pb overlap each other.

Next, a configuration example of the common image (or the first image) 21, the second image 22, and the third image 23 visible on the printed material B of the second example will be described.

As described above, in the printed material B, a visible image changes according to the conditions. As in the examples shown in FIGS. 7 to 10, the printed material B changes to the visible state and show four kinds of images according to two conditions.

When both the first condition and the second condition are not satisfied (hereinafter referred to as "state a"), the common image 21 is visible as the first image. The common image 21 is an image of a common part of the first image pattern Pa and the second image pattern Pb which are machine-readable codes, and therefore is not recognized as a particular piece of information. However, the first image pattern Pa and the second image pattern Pb may be designed such that the common image 21 is recognized as specific information (hereinafter referred to as third information). In this case, an image indicating the third information is visible on the printed material B in a state in which both the first condition and the second condition are not satisfied (i.e., "state a").

When the first condition is satisfied and the second condition is not satisfied (hereinafter referred to as "state b"), the common image (i.e., the first image) 21 and the second image 22 are visible on the printed material B. The common image (i.e., the first image) 21 and the second image 22 are visible as the first image pattern Pa which is a machine-readable code indicating particular information. The first image pattern Pa is a machine-readable code (e.g., a two-dimensional code) recognized as particular information (hereinafter referred to as first information). Therefore, an image indicating the first information is visible on the printed material B in a state in which the first condition is satisfied and the second condition is not satisfied (i.e., "state b").

When the first condition is not satisfied and the second condition is satisfied (hereinafter referred to as "state c"), the common image (i.e., the first image) 21 and the third image 23 are visible on the printed material B. The common image (i.e., the first image) 21 and the third image 23 are visible as the second image pattern Pb. The second image pattern Pb is a machine-readable code (for example, a two-dimensional code) that is recognized as particular information (hereinafter referred to as second information) that differs from the first information. Therefore, an image indicating the second information is visible on the printed material B in a state in which the first condition is not satisfied and the second condition is satisfied (i.e., "state c").

When both the first condition and the second condition are satisfied (hereinafter referred to as "state d"), the common image (i.e., the first image) 21, the second image 22, and the third image 23 are visible on the printed material B. The common image (i.e., the first image) 21 and the third image 23 are visible as an image in which the first image pattern Pa and the second image pattern Pb are superimposed. The image obtained by superimposing the first image pattern Pa and the second image pattern Pb, which are machine-readable codes, is generally not recognized as particular data. However, the first image pattern Pa and the second image pattern Pb may be designed such that the superimposed image is recognized as particular information (hereinafter referred to as fourth information). In this case, an image indicating the fourth information is visible on the printed material B in a state in which both the first condition and the second condition are satisfied (i.e., "state d").

The first condition and the second condition can be set differently by selecting the second material and the third material from different image forming materials. For example, the first and second materials may be selected from decolorable materials whose states change at particular temperatures, materials whose states change in water or a specific aqueous solution, materials whose states change in specific lights, and the like. However, it is assumed that the first condition and the second condition are different conditions.

As an example of the operation, it is possible to realize the printed material B in which the first condition is a temperature and the second condition is a condition other than the temperature. As such a specific example, the printed material B is conceivable in which the first material develops color at a predetermined temperature or higher (i.e., the first condition), and the second material develops color at a time when the second material is wetted with water (i.e., the second condition). Here, a combination of a plurality of conditions in which the first condition is equal to or higher than a predetermined temperature and the second condition is wetted with water is referred to as a first condition group.

In the printed material B of the first condition group, a visible image changes depending on whether the printed material B is at the predetermined temperature or higher and whether the printed material B is wet with water. The printed material B of the first condition group shows an image (i.e., a first image pattern) recognized as the first information at the predetermined temperature or higher and in a state where the printed material B is not wet with water. The printed material B of the first condition group shows an image (i.e., a second image pattern) recognized as the second information in a state of being less than the predetermined temperature and wet with water. In addition, the printed material B of the first condition group shows an image (or an image recognized as the third information) that is not recognized as the specific information in a state where the printed material B is below the predetermined temperature and is not wet with water. Furthermore, the printed material B of the first condition group shows an image (or an image recognized as the fourth information) that is not recognized as specific information at a predetermined temperature or higher and in a state of being wet with water.

In addition, in the printed material B, different temperatures may be used as the first condition and the second condition. For example, the printed material B may be one in which the second material and the third material develop color or are decolored at different temperatures.

As an example of the combination of conditions according to temperature, the first temperature condition is set to be less than a first temperature, and the second temperature is set to be equal to or higher than a second temperature higher than the first temperature. The printed material B of the first temperature condition group shows the second image below the first temperature, and shows the third image above the second temperature. In addition, the printed material B of the first temperature condition group shows only the common image 21 at the first temperature or higher and lower than the second temperature.

As the second temperature condition group, the first condition is set to be lower than the first temperature, and the second condition is set to be equal to or higher than a third temperature lower than the first temperature. The printed material B of the second temperature condition group shows the second image below the third temperature, and shows the third image above the third temperature. Further, the printed material B of the second temperature condition group shows the common image, the second image, and the third image at a temperature lower than the third temperature, a temperature higher than or equal to the first temperature, and a temperature lower than the second temperature.

As the third temperature condition group, the first condition is set to be equal to or higher than a fourth temperature and lower than the first temperature, and the second condition is set to be equal to or higher than the second temperature from the fourth temperature to the first temperature. The printed material B of the third temperature condition group shows the second image at the fourth temperature or higher and lower than the second temperature, and shows the third image at the first temperature or higher. Further, the printed material B of the third temperature condition group shows only the common image at a temperature lower than the fourth temperature, and shows the common image, the second image, and the third image at a temperature higher than or equal to the second temperature and lower than the first temperature.

In the examples of FIGS. 7 to 10 described above, an example in which a plurality of image codes are constituted by a combination of the common image, the second image, and the third image has been described, but the present invention is not limited thereto. For example, the printed material B may show a plurality of AR markers by combining the common image, the second image, and the third image. In the printed material B, the common image may be the first AR marker, the composite image of the common image and the second image may be the second AR marker, and the composite image of the common image and the third image may be the third AR marker. Further, in the printed material B, in addition to the first, second, and third AR markers described above, a composite image of the common image, the second image, and the third image may be used as the fourth AR marker.

As described above, in the printed material B of the second example, an image to be visible varies depending on a combination of a plurality of conditions. The printed material B includes a common image that is in the visible state regardless of the first and second conditions, a second image that is in the visible state under the first condition, and a third image that is in the visible state under the second condition. When the first condition is satisfied and the second condition is not, the second image is in the visible state and the third image is in the invisible state. When the first condition is not satisfied and the second condition is satisfied, the second image is in the invisible state and the third image is in the visible state in the printed material B. Thus, the printed material B can selectively show the first image pattern composed of the common image and the second image, and the second image pattern composed of the common image and the third image according to the conditions.

In addition, the printed material B can selectively show the first image code set in the first image pattern and the second image code set in the second image pattern under a plurality of conditions. In this case, the information processing apparatus that reads and recognizes the image code can read various pieces of information from the printed material B in which the machine-readable code to be visible changes according to the conditions. That is, the information processing apparatus can read the first information from the printed material B when the first condition is satisfied and the second condition is not satisfied. The information processing apparatus can read the second information from the printed material B when the first condition is not satisfied and the second condition is satisfied.

Next, a configuration example of a printing system 100 that is an example of the image forming apparatus that produces printed materials A and B will be described.

Figure 11:
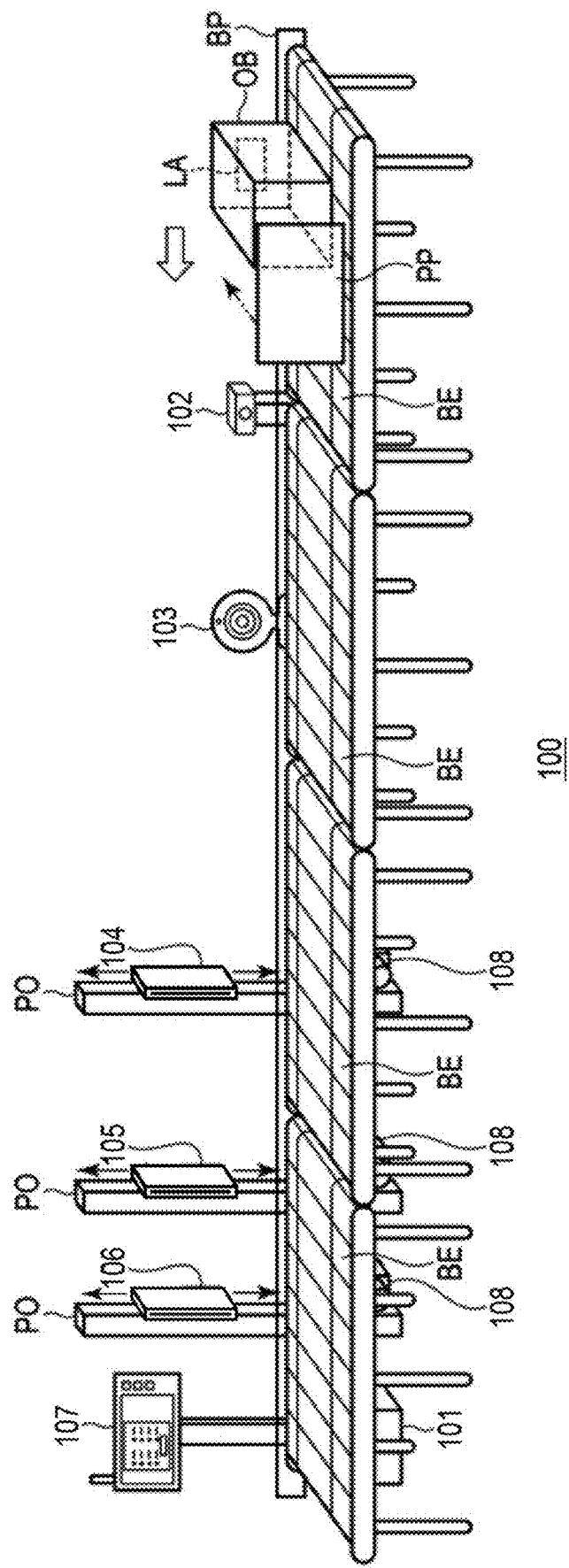
FIG. 11 is a configuration diagram of an image forming apparatus for producing the printed materials of the first and second examples.

FIG. 11 is a diagram illustrating a configuration example of the printing system 100 for producing the printed materials A and B according to an embodiment.

The printing system 100 illustrated in FIG. 11 is an example of an image forming apparatus placed in a workplace or the like. FIG. 11 illustrates an example configuration of the printing system 100 including a first printer 104 for printing an image with a first material, a second printer 105 for printing an image with a second material, and a third printer 106 for printing an image with a third material. However, the printing system 100 may have printers in which a plurality of images are printed using a plurality of materials. For example, the printing system 100 may include two printers (i.e., a first printer that prints an image using a first material and a second printer that prints an image using a second material), or may include four or more printers.

The printing system 100 includes a conveyor belt BE on which a print target object OB is placed. The conveyor belt BE is a conveyer that conveys the print target object OB. For example, the conveyor belt BE moves at a constant velocity. The conveyor belt BE conveys the print target object OB to a plurality of image forming positions, as indicated by white arrows in FIG. 11. In the exemplary embodiment shown in FIG. 11, the conveyor belt BE conveys the print target object OB to a first print position, a second print position, and a third print position in the printing system 100.

Note that the conveyor belt BE is not limited to a configuration including four belts as shown in FIG. 11. For example, the conveyor belt BE may be configured by one belt including all the image forming positions, or may be configured by a plurality of belts other than four.

Further, the printing target print target object OB shown in FIG. 11 is a box-shaped object having a printing surface on which decolorable images are printed. The print target object OB is placed on the conveyor belt BE such that the printing surface including the print area is oriented in a direction perpendicular to the conveyance direction of the print target object OB. The print target object OB is an exemplary substrate, and may be any material as long as a print area for printing images is provided on the print surface. For example, the print target object OB may be one in which a label LA serving as a substrate on which images are printed is affixed to a print area.

The printing system 100 includes a controller 101, a timing sensor 102, an object sensor 103, the first printer 104, the second printer 105, the third printer 106, a user interface 107, and three motors 108. The timing sensor 102, the object sensor 103, the first printer 104, the second printer 105, the third printer 106, and the user interface 107 are arranged along the conveyor belt BE.

The controller 101 controls the operation of each component of the printing system 100. The controller 101 controls the printers 104-106 to print images on the print target print target object OB based on print information. When images are printed using two materials, the controller 101 acquires the data of the first image formed using the first material (hereinafter referred to as the first image data) and the data of the second image formed using the second material (hereinafter referred to as the second image data). The controller 101 controls the first printer 104 based on the first image data to print the first image formed by the first material on the print target object OB. The controller 101 controls the second printers 105 based on the second image data to print the second image formed of the second material on the print target object OB.

Also, when printing images using three materials, the printing system 100 acquires the data of the first, second, and third images formed of the first, second, and third materials. The controller 101 controls the first printer 104 based on the first image data to print the first image formed by the first material on the print target object OB. The controller 101 controls the second printers 105 based on the second image data to print the second image formed of the second material on the print target object OB. The controller 101 controls the third printers 106 based on the third image data to print the third image formed by the third material on the print target object OB.

The timing sensor 102 detects the print target object OB. The timing sensor 102 detects that the print target object OB conveyed by the conveyor belt BE has reached a predetermined position. The timing sensor 102 is, for example, a photoelectric sensor. The controller 101 controls the operation timings of the respective units with reference to the point in time when the timing sensor 102 detects the arrival of the print target object OB.

The object sensor 103 captures an image of the print target object OB. The object sensor 103 includes, for example, an image sensor such as a camera. The object sensor 103 and the controller 101 constitute a print area detecting unit that detects the size and position of the print area in the print target object OB. The controller 101 detects the position of the print area on the print target object OB based on the image of the print target object OB captured by the object sensor 103.

When the print area is designated on the printing surface of the print target object OB, the controller 101 detects the position and size of the print area on the print target object OB. For example, when a label LA for image printing is attached to the print target OB, the controller 101 detects the position and size of the label for image printing. In addition, the controller 101 detects, as the position of the print area, a distance from the front end portion of the print target object OB in the conveyance direction on the printing surface and a distance from the upper end portion of the printing surface (a distance from the surface facing the placing surface).

Further, the controller 101 may automatically determine the size and the position of the print area in the print target object OB based on the image of the print target object OB captured by the object sensor 103. For example, when a particular print area is not designated on the print target object OB, the controller 101 detects the print surface of the print target object OB. The controller 101 determines the size and the position of the print area based on the size of the print surface of the print target object OB.

The first printer 104 forms an image using the first material. The first printer 104 and the controller 101 constitute a first printing unit that forms a first image in the print area on the printing surface of the print target object OB. For example, the first printer 104 is an inkjet printer using the first material. The first printer 104 is held by a support PO in a height-movable manner by a motor 108 as indicated by solid arrows in FIG. 11.

The first printer 104 is supported by the support PO so that the first image can be formed in the print area from a direction perpendicular to the conveyance direction of the print target object OB (i.e., the side surface side in the conveyance direction). The controller 101 controls the motor 108 based on the size and the position of the print area determined using the object sensor 103. The controller 101 controls the motor 108 to adjust the height position of the first printer 104 to match the print area. In addition, the controller 101 operates the first printer 104 at a timing at which the print area calculated based on the detection time point by the timing sensor 102 passes. The first printer 104 prints the first image using the first material on the print target object OB at a timing at which the print area passes, under the control of the controller 101.

The second printer 105 forms an image using the second material. The second printer 105 is disposed behind the first printer 104 along the conveyance direction. The second printer 105 and the controller 101 constitute a second printing unit that forms a second image in the print area on the printing surface of the print target object OB. For example, the second printer 105 is an inkjet printer using the second material. The second printers 105 are supported by a support PO in a height-movable manner by the motor 108 as indicated by solid arrows in FIG. 11.

The second printer 105 is supported by the support PO so that the second images can be formed in the print area from a direction perpendicular to the conveyance direction of the print target object OB (i.e., the side surface side in the conveyance direction). The controller 101 controls the motor 108 to adjust the height position of the second printer 105 to match the print area. In addition, the controller 101 operates the second printer 105 at a timing at which the print area calculated based on the detection time point by the timing sensor 102 passes. The second printer 105 prints the second image using the second material on the print target object OB at a timing at which the print area passes, under the control of the controller 101.

The third printer 106 forms an image using the third material. The third printer 106 is disposed behind the second printer 105 along the conveyance direction. The third printer 106 and the controller 101 constitute a third printing unit that forms a third image in the print area on the printing surface of the print target object OB. For example, the third printer 106 is an inkjet printer using the third material. The third printers 106 are supported by a support PO in a height-movable manner by the motor 108 as indicated by solid arrows in FIG. 11.

The third printer 106 is supported by the support PO so that the third image can be formed in the print area from a direction perpendicular to the conveyance direction of the print target object OB (i.e., the side surface side in the conveyance direction). The controller 101 controls the motor 108 to adjust the height position of the third printer 106 to match the print area. In addition, the controller 101 operates the third printer 106 at a timing at which the print area calculated based on the detection time point by the timing sensor 102 passes. The third printer 106 prints the third image using the third material on the print target object OB at a timing at which the print area passes, under the control of the controller 101.

The printing system 100 may include a first scanner that reads the first image printed by the first printer 104 on the printing surface of the print target object OB. The controller 101 may recognize the image read by the first scanner to confirm whether the first image is accurately printed on the print surface of the print target object OB. The printing system 100 may further include a second scanner that reads the second images printed by the second printer 105 on the printing surface of the print target object OB. The printing system 100 may further include a third scanner that reads the third images printed by the third printer 106 on the printing surface of the print target object OB.

The user interface (UI) 107 includes a display, an input device, and the like. For example, the user interface 107 includes a system monitor for displaying various types of information output from the controller 101. The user interface 107 includes one or more keys, one or more buttons, and the like for inputting various instructions to the controller 101. The user interface 107 may be configured by a device including a touch panel as an input device in which touch keys are arranged on a monitor screen such as a liquid crystal display.

In the configuration illustrated in FIG. 11, the printing system 100 includes an abutting plate BP and a pressing plate PP with the conveyor belt BE sandwiched between both sides thereof. The abutting plate BP extends along the conveyor belt BE. The abutting plate BP may be constituted by a plurality of consecutive plates. The pressing plate PP moves toward the abutting plate BP as indicated by the dashed-dotted arrow in FIG. 11. The pressing plate PP abuts on the print target object OB conveyed by the conveyor belt BE and presses the print target object OB toward the abutting plate BP. The pressing plate PP brings the printing surface of the print target object OB into contact with the abutting plate BP.

The printing surface of the print target object OB is aligned with the conveyance direction. The abutting surface of the abutting plate BP that abuts the print target object OB is formed of a low-friction material so as not to affect the conveyance of the print target object OB. When the printing surface of the print target object OB abuts against the abutting plate BP, the pressing plate PP is retracted to the starting position. Whether the printing surface of the print target object OB has hit the abutting plate BP is detected as, for example, a change in repulsive force, or is determined from images captured by a camera.

Note that the operation timing of the pressing plate PP is, for example, a timing corresponding to the operation instruction of the operator when the operator places the print target object OB on the conveyor belt BE. When the print target object OB is placed by the pickup mechanism, the controller 101 can also perform timing control based on the placing operation of the pickup mechanism.

Figure 12:
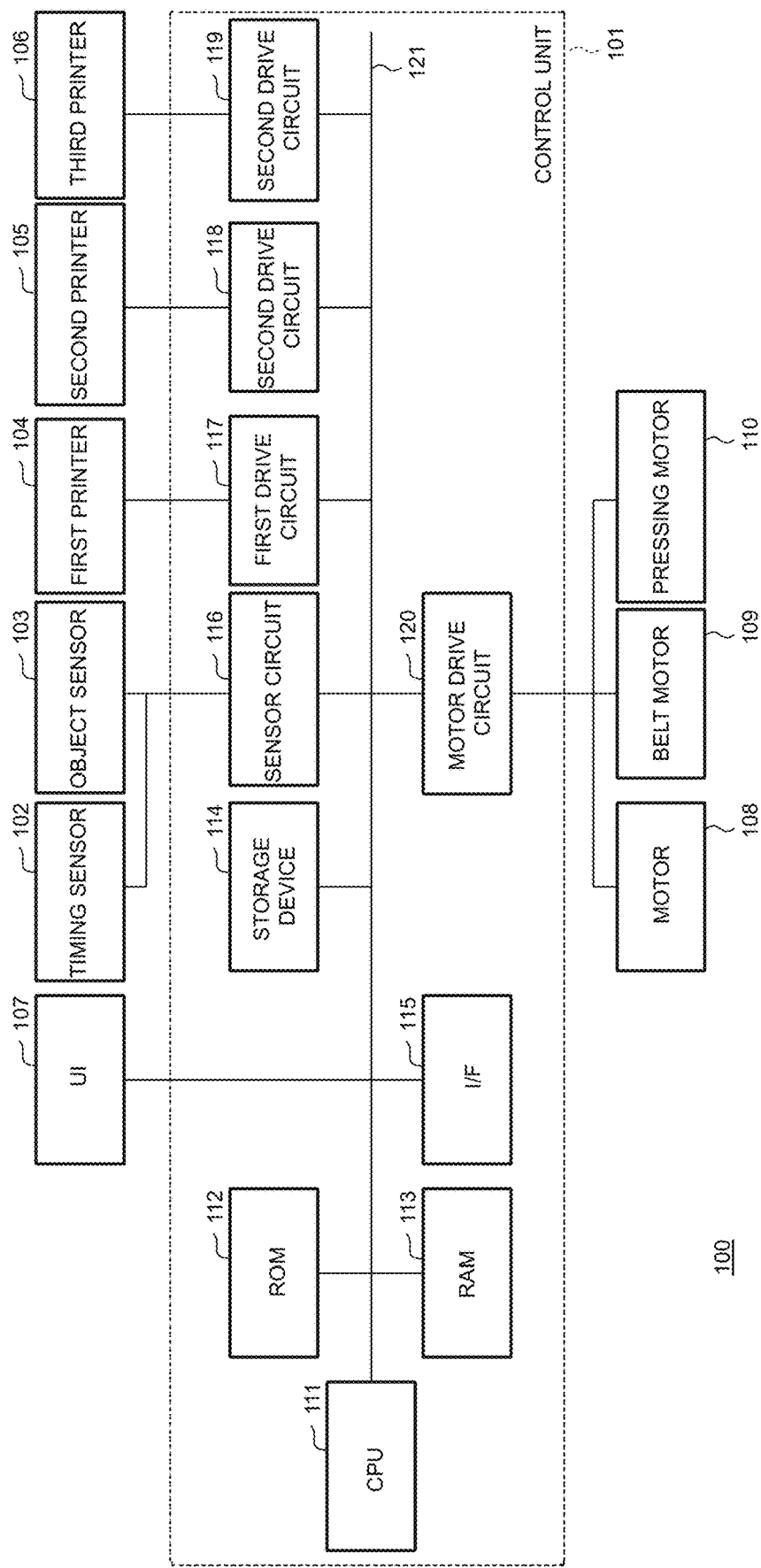
FIG. 12 is a hardware block diagram of the image forming apparatus.

FIG. 12 is a hardware block diagram of the printing system 100.

The controller 101 includes a CPU 111, a ROM 112, a RAM 113, a storage device 114, an interface (UF) 115, a sensor circuit 116, a first drive circuit 117, a second drive circuit 118, a third drive circuit 119, and a motor drive circuit 120. The CPU 111 is connected to the ROM 112, the RAM 113, the storage device 114, the interface (UF) 115, the sensor circuit 116, the first drive circuit 117, the second drive circuit 118, the third drive circuit 119, and the motor drive circuit 120 through a bus 121.

The CPU 111 is a processor having a function of controlling operations of the entire printing system 100. The CPU 111 performs various functions by executing programs stored in the ROM 112. The CPU 111 can execute a plurality of pieces of information processing at the same time by multi-core or multi-thread configuration. Note that one or more of the functions performed by the CPU 111 may be performed by one or more hardware circuits such as Application Specific Integrated Circuits (ASIC), Field-Programmable Gate Arrays (FPGA), and Graphics Processing Units (GPU). The CPU 111 may control the functions performed by such hardware circuits.

The ROM 112 is a non-volatile memory that stores control programs, control data, and the like.

The RAM 113 is a volatile memory. The RAM 113 temporarily stores data and the like that are being processed by the CPU 111. The RAM 113 may store data required to execute the program, an execution result of the program, and the like. For example, the RAM 113 temporarily stores, as print information, the first image data for forming the first image on the print target object OB by the first material. The RAM 113 temporarily stores the second image data for forming the second image on the print target object OB by the second material. The RAM 113 temporarily stores the third image data for forming the third image on the print target object OB by the third material.

The storage device 114 is an auxiliary storage device such as an Electric Erasable Programmable Read-Only Memory (EEPROM) (registered trademark), a Hard Disc Drive (HDD), a Solid State Drive (SSD). The storage device 114 stores data used by the CPU 111 to perform various types of processing and data generated by processing in the CPU 111 in a nonvolatile manner.

For example, the storage device 114 may store various pieces of information associated with various images printed on the printed materials A and B. When a plurality of AR markers are printed, the storage device 114 may store various contents associated with the AR markers. In the case of printing on the printed material a plurality of image codes, the storage device 114 may store various pieces of information indicated by the image codes.

The interface 115 includes a network interface circuit that transmits and receives data to and from an external device via a network such as LAN. The interface 115 may include an interface circuit that reads and writes data from and to a removable memory medium such as a USB memory or a memory card.

The sensor circuit 116 includes a circuit as an interface connected to the timing sensor 102. The sensor circuit 116 transmits the signal detected by the timing sensor 102 to the CPU 111. The sensor circuit 116 includes a circuit as an interface connected to the object sensor 103. The sensor circuit 116 transmits signals detected by the object sensor 103 to the CPU 111.

The first drive circuit 117 includes an interface circuit connected to the first printer 104. For example, the CPU 111 supplies the first drive circuit 117 with an image forming signal based on the first image data stored in the RAM 113. The first driver 117 drives the first printer 104 according to the signal input from the CPU 111. Thus, the first printer 104 forms the first image using the first material. An inkjet printer, which is an example of the first printer 104, forms the first image by ejecting ink as the first material in response to the signal from the first drive circuit 117.

The second drive circuit 118 includes an interface circuit connected to the second printer 105. When the second printer 105 is an ink-jet printer, the second driver 118 drives the second printer 105 according to the signal input from the CPU 111. For example, the CPU 111 supplies the second drive circuit 118 with the image forming signal based on the second image data stored in the RAM 113. Thus, the second printer 105 forms the second image using the second material.

The third drive circuit 119 includes an interface circuit connected to the third printer 106. The CPU 111 supplies to the third drive circuit 119 an image forming signal based on the third image data stored in the RAM 113. The third driver 119 drives the third printers 106 according to the signal input from the CPU 111. Thus, the third printer 106 forms the third image using the third material.

The motor drive circuit 120 controls driving of the motors 108, a belt motor 109, and a pressing motor 110 in accordance with the signals issued by the CPU 111. The motor drive circuit 120 independently controls each of the motors 108 for the first printer 104, the second printer 105, and the third printer 106. The belt motor 109 is a motor for driving the conveyor belt BE. The belt motor 109 may be composed of a plurality of motors. The pressing motor 110 is a motor that moves the pressing plate PP.

Also, the user interface (UI) 107 is connected to the CPU 111 via the bus 121. The user interface 107 transmits and receives data via the bus 121. For example, the user interface 107 controls the display content to be displayed on the display based on the display data generated by the CPU 111. In addition, the user interface 107 supplies information input by the operator to an operating unit such as a touch panel to the CPU 111.

Note that the printing system 100 having the configuration illustrated in FIGS. 11 and 12 described above is an example of an image forming apparatus for producing the printed materials A or B according to an embodiment. The image forming apparatus is not limited to the configuration of the printing system 100 including a plurality of inkjet printers illustrated in FIGS. 11 and 12. The image forming apparatus may include a plurality of other image forming devices each forming an image with the first material, the second material, and the third material. Further, the image forming material as the first material, the second material, and the third material for the image forming apparatus to form each image is not limited to ink, and may be toner or the like.

In the image forming apparatus according to an embodiment, a plurality of image forming devices that form images using the first material, the second material, and the third material may use any mechanism other than an ink-jet mechanism. In other words, the plurality of image forming devices included in the image forming apparatus according to the embodiment are not limited to inkjet printers, and all or a part of the plurality of image forming devices may use an electrophotographic system, a thermal transfer system, or the like. For example, the image forming apparatus according to an embodiment may include a first image forming device that forms an image with a non-decolorable toner and a second image forming device that forms an image with a decolorable toner. Further, such an image forming apparatus may include a third image forming device that forms an image with a decolorable toner having a characteristic different from that of the decolorable toner used by the second image forming device.

Next, an operation example of the printing system 100 in an embodiment will be described.

Figure 13:
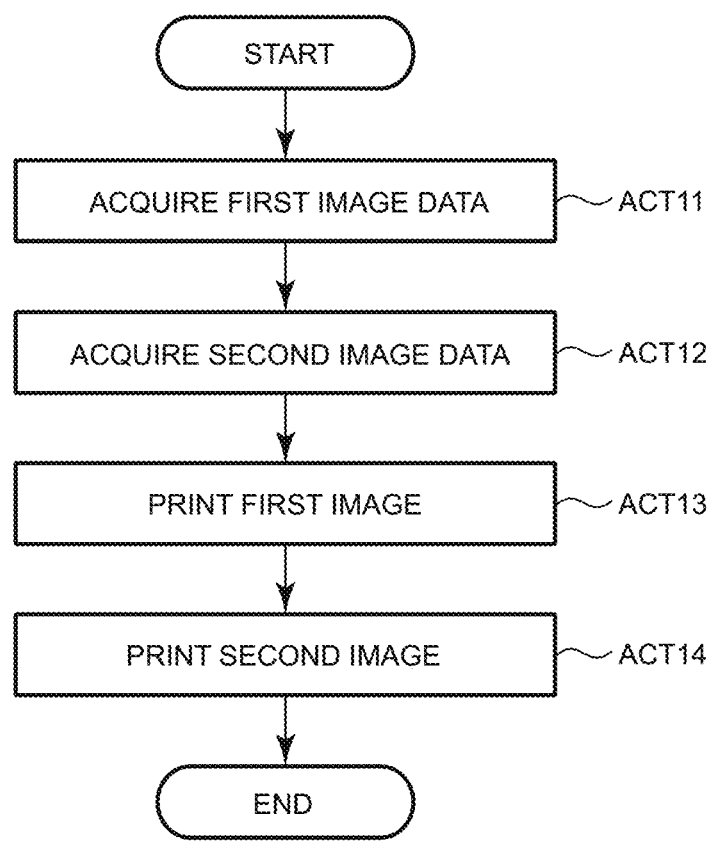
FIG. 13 is a flowchart of a first printing process for the image forming apparatus to produce the printed material of the first example.

FIG. 13 is a flowchart of a first production process in which the printing system 100 produces the printed material A.

The first production process illustrated in FIG. 13 is an operation example of a production process for producing the printed material A of the first example illustrated in FIGS. 1 and 2. As described above, the printed material A illustrated in FIGS. 1 and 2 is obtained by printing the first image 11 formed of the first material and the second image 12 formed of the second material on the substrate 10. The printing system 100 produces the printed material A by printing the first image 11 formed of the first material on the substrate 10 and printing the second image 12 formed of a second material on the substrate 10.

The CPU 111 acquires (ACT11) the first image data indicating the first image 11 to be printed on the substrate 10 of the printed material A. For example, the CPU 111 acquires the first image data from an external device via the interface 115. Further, the CPU 111 may acquire the first image data from the user interface 107 or the like. The CPU 111 stores the acquired first image data in the RAM 113. The CPU 111 may store the first image data and the first content associated with the first image indicated by the first image data in the storage device 114. The first image indicated by the first image data is an image associated with the first content (i.e., the first AR marker). When the AR application is executed and the first image is captured by the camera, an information processing apparatus D can acquire and display the first content associated with the first image.

In addition, the CPU 111 acquires the second image data indicating the second image 12 to be printed on the substrate 10 of the printed material A (ACT12). For example, the CPU 111 acquires the second image data from the external device via the interface 115. Further, the CPU 111 may acquire the second image data from the user interface 107 or the like. The CPU 111 stores the acquired second image data in the RAM 113. In addition, the CPU 111 may store the second content associated with the composite image obtained by combining the second image data, the first image, and the second image in the storage device 114.

Once acquiring the first image data, the CPU 111 controls the first printer 104 to print the first image 11 formed of the first material on the substrate 10 (ACT13). For example, the CPU 111 issues to the first drive circuit 117 an image forming signal based on the first image data. The first drive circuit 117 supplies a drive signal based on the image forming signal input from the CPU 111 to the first printers 104. The first printer 104 prints the first images 11 formed by using the first material on the substrate 10 (i.e., the printing surface on the print target object OB) by driving the first image by the drive signal from the first drive circuit 117.

Once acquiring the second image data, the CPU 111 controls the second printer 105 to print the second image 12 formed of the second material on the substrate 10 (ACT13). For example, the CPU 111 issues to the second drive circuit 118 an image forming signal based on the second image data. The second drive circuit 118 supplies a drive signal based on the image forming signal input from the CPU 111 to the second printers 105. The second printer 105 prints the second image 12 formed of the second material on the substrate 10 (i.e., the printing surface on the print target object OB) by driving the second image with the drive signal from the second drive circuit 118.

The CPU 111 also controls the second printer 105 to print the second image on the substrate 10 based on the second image data in alignment with the first image printed on the substrate 10. For example, the CPU 111 acquires, as the second image data, data of a difference image between an image to be the second AR marker (i.e., composite image) and the first image. The CPU 111 then controls the second printer 105 to print the second image based on the second image data in addition to the first image. Further, the CPU 111 may acquire data of the entire image as the second AR marker (i.e., composite image) as the second image data. Then, the CPU 111 controls the second printer 105 to print the second image based on the second image data superimposed on the first image. Accordingly, the printing device 100 can print the first image as the first AR marker and the second image as the second AR marker combined with the first image on the substrate. Consequently, the printing system 100 can produce the printed material A that shows either the first AR marker or the second AR marker depending on the conditions.

By the above-described first production process, the printing system 100 produces the printed material A in which the first image formed of the first material and the second image formed of the second material are printed on the substrate 10. The printed material A produced in the first production process displays the first image, which is the first AR marker, when the second material is invisible. In addition, the printed material A produced by the first production process shows the composite image of the first image and the second image, which is the second AR marker, when the second material is in the visible state. That is, the printing system 100 can produce the printed material A that selectively shows either the first AR marker (i.e., the first image) or the second AR marker (i.e., the first image and the second image) depending on the conditions.

Further, the printing system 100 may execute the first production process using a non-decolorable image forming material as the first material and a decolorable image forming material as the second material under a predetermined decoloring condition. As a result, the printing system 100 can produce the printed material A in which the first AR marker is visible in a state where the decoloring condition is satisfied, and the second AR marker is visible in a state where the decoloring condition is not satisfied.

Next, a second production process of producing the printed material B by the printing system 100 according to an embodiment will be described.

Figure 14:
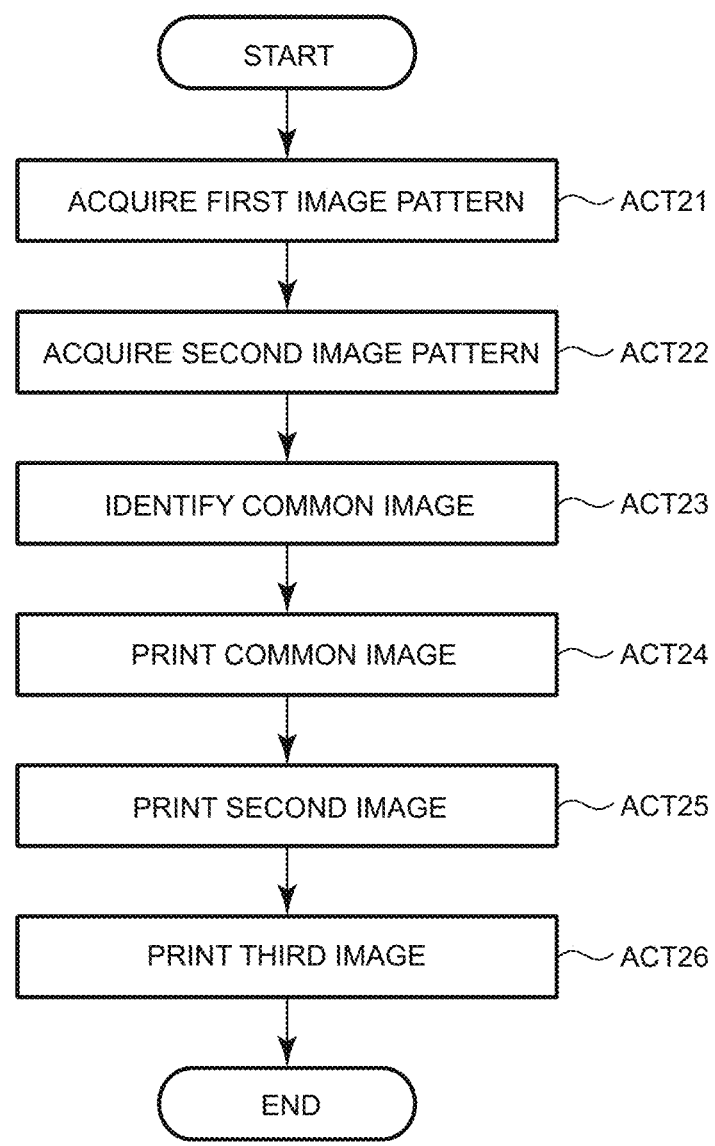
FIG. 14 is a flowchart of a second printing process for the image forming apparatus to produce the printed material of the second example.

FIG. 14 is a flowchart of the second production process by the printing system 100 to produce the printed material B. According to the processing example illustrated in FIG. 14, it is assumed that the printing system 100 executes the production process of the printed material B as illustrated in FIGS. 7 to 10. As described above, the printed material B illustrated in FIGS. 7 to 10 is obtained by printing the first, second, and third images formed of the first, second, and third materials on the substrate 20.

The CPU 111 acquires the first image data indicating the first image pattern Pa to be printed on the printed material B (ACT21). For example, the CPU 111 acquires the first image data, which is the first image pattern Pa, from an external device via the interface 115. Further, the CPU 111 may acquire the first image data from the user interface 107 or the like. The CPU 111 stores the acquired first image data in the RAM 113. The CPU 111 may store the first image pattern Pa and the first information indicated by the first image pattern Pa in the storage device 114.

In addition, the CPU 111 acquires the second image data indicating the second image pattern Pb that differs from the first image pattern Pa is to be printed on the printed material B (ACT22). For example, the CPU 111 acquires the second image data, which is the first image pattern Pa, from the external device via the interface 115. Further, the CPU 111 may acquire the second image data from the user interface 107 or the like. The CPU 111 stores the acquired second image data in the RAM 113. The CPU 111 may store the second image pattern Pb and the second information indicated by the second image pattern Pb in the storage device 114.

The first image pattern Pa and the second image pattern Pb are, for example, machine-readable codes (e.g., two-dimensional codes) that can be decoded into particular data. An information processing apparatus D can acquire the data indicated by each image pattern by executing a program for reading the code. For example, the information processing apparatus D can read the first image pattern Pa as the first information, and can recognize the second image pattern Pa as the second information.

The CPU 111 acquires image data of the first image pattern Pa and the second image pattern Pb, and identifies a common image of the first image pattern Pa and the second image pattern Pb (ACT23). For example, the CPU 111 compares the first image pattern Pa and the second image pattern Pb of the same size, and generate a pixel group common to both images as the common image 21.

Once acquiring the common image, the CPU 111 controls the first printer 104 to print the common image on the substrate (ACT24). The CPU 111 causes the first printer 104 to print the common image 21 on the substrate 20. For example, the CPU 111 issues to the first drive circuit 117 an image forming signal based on the image data of the common image 21. The first drive circuit 117 supplies a drive signal based on the image forming signal input from the CPU 111 to the first printers 104. The first printer 104 prints the common image 21 using the first material on the substrate 20 (i.e., the printing surface on the print target object OB) by driving the same by the drive signal from the first drive circuit 117.

The CPU 111 also controls the second printer 105 to print the second image formed by the second material on the substrate 20 (ACT25). The CPU 111 causes the second printer 105 to print the second image 22 on the substrate 20 in alignment with the common image 21 printed on the substrate 20. For example, the CPU 111 generates a difference image between the first image pattern Pa and the common image 21 as the second image 22. Here, the CPU 111 supplies to the second drive circuit 118 an image forming signal based on the image data of the second image 22. The second drive circuit 118 supplies a drive signal based on the image forming signal input from the CPU 111 to the second printer 105. The second printer 105 prints the second image 22 using the second material on the substrate 20 (i.e., the printing surface on the print target object OB) by driving the second image with the drive signal from the second drive circuit 118. Note that the CPU 111 may control the second printer 105 to print the entire image of the first image pattern Pa as the second image 22 by superimposing the image on the common image 21.

The CPU 111 also controls the third printer 106 to print the third image 23 formed by the third material on the substrate 20 (ACT26). In addition, the CPU 111 causes the third printer 106 to print the third image 23 on the substrate 20 in alignment with the common image 21 printed on the substrate 20. For example, the CPU 111 generates a difference image between the second image pattern Pb and the common image 21 as the third image 23. The CPU 111 issues to the third drive circuit 119 an image forming signal based on the image data of the third image 23. The third drive circuit 119 supplies a drive signal based on the image forming signal input from the CPU 111 to the third printer 106. The third printer 106 prints the third image 23 using the third material on the substrate 20 (i.e., the printing surface on the print target object OB) by driving the third image by the drive signal from the third drive circuit 119. Note that the CPU 111 may control the third printer 106 to print an image of the entire second image pattern Pb on the common image 21 as the third image 23.

As described above, the printing system 100 produces the printed material B on which the common image (i.e., the first image), the second image, and the third image are printed on the substrate 20 by the second production process. The printing system 100 forms the common image using the first material that maintains the visible state regardless of the first and second conditions. The printing system 100 forms the second image using the second material that changes to the visible state (or the invisible state) under the first condition. The printing system 100 forms the third image using the third material that changes to the visible state (or the invisible state) under the second condition different from the first condition.

Thus, the printed material B produced by the second production process displays the first image pattern when the second material is in the visible state and the third material is in the invisible state. In addition, the printed material B produced by the second production process shows the second image pattern when the second material is in the invisible state and the third material is in the visible state. That is, the printed material B produced by the second production process can selectively show either the first image pattern or the second image pattern depending on the states of the second material and the third material.

In the printing system 100, the first material is non-decolorable, the second material is colored (or decolored) under the first condition, and the third material is colored (or decolored) under the second condition. In this case, the printing system 100 can produce the printed material B in which the first image pattern is visible in a state where the first condition is satisfied and the second condition is not satisfied. In addition, the printing system 100 is capable of producing the printed material B in which the second image pattern is visible in a state where the first condition is not satisfied and the second condition is satisfied.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
a first printer configured to print on a medium using a first material;
a second printer configured to print on the medium using a second material that turns invisible when a first condition is satisfied; and
a processor configured to:
control the first printer to print on the medium a first symbol that is machine-readable and associated with first information, and
control the second printer to print a second symbol on the medium on which the first symbol has been printed, wherein a composite symbol of the first and second symbols is machine-readable and associated with second information different from the first information, wherein the first symbol is readable by an information processing apparatus and causes the information processing apparatus to display the first information when read by the information processing apparatus, and the composite symbol is readable by the information processing apparatus and causes the information processing apparatus to display the second information when read by the information processing apparatus.

2. The image forming apparatus according to claim 1, wherein the second material is decolored at a predetermined temperature, and the first condition is satisfied when a temperature of the second material reaches the predetermined temperature.

3. The image forming apparatus according to claim 1, wherein the first symbol and the composite symbol are augmented reality (AR) markers.

4. The image forming apparatus according to claim 1, further comprising:

a conveyor along which the first and second printers are arranged and on which the medium is conveyed when the first and second symbols are printed.

5. The image forming apparatus according to claim 4, further comprising:

a first sensor disposed along the conveyor for capturing an image of the medium being conveyed on the conveyor, wherein the processor is configured to determine, based on the captured image, a print area of the first and second symbols on the medium.

6. The image forming apparatus according to claim 4, further comprising:

a second sensor disposed along the conveyor for detecting the medium that has been conveyed on the conveyor and outputting a signal when the medium is detected, wherein the processor is configured to determine when the first and second printers are to print the first and second symbols, based on the signal from the second sensor.

7. The image forming apparatus according to claim 1, further comprising:

first and second supports extending vertically and to which the first and second printers are attached in a movable manner.

8. An image forming apparatus comprising:

a first printer configured to print on a medium using a first material;

a second printer configured to print on the medium using a second material that turns invisible when a first condition is satisfied;

a third printer configured to print on the medium using a third material that turns invisible when a second condition different from the first condition is satisfied; and a processor configured to:

control the first printer to print on the medium a first pattern, control the second printer to print a second pattern on the medium on which the first pattern has been printed, wherein a first composite pattern of the first and second patterns is machine-readable and associated with first information, and control the third printer to print a third pattern on the medium on which the first and second patterns have been printed, wherein a second composite pattern of the first and third patterns is machine-readable and associated with second information different from the first information.

9. The image forming apparatus according to claim 8, wherein the second and third materials are decolored at first and second predetermined temperatures, respectively, the first condition is satisfied when a temperature of the second material reaches the first predetermined temperature, and the second condition is satisfied when a temperature of the third material reaches the second predetermined temperature.

10. The image forming apparatus according to claim 8, wherein when both the first and second conditions are satisfied, the first pattern is visible on the medium, and when neither the first condition nor the second condition is satisfied, a third composite pattern of the first, second, and third patterns is visible on the medium.

11. The image forming apparatus according to claim 8, wherein the first composite pattern is readable by an information processing apparatus and causes the information processing apparatus to display the first information when read by the information processing apparatus, and the second composite pattern is readable by the information processing apparatus and causes the information processing apparatus to display the second information when read by the information processing apparatus.

12. The image forming apparatus according to claim 11, wherein the first and second composite patterns are augmented reality (AR) markers.

13. The image forming apparatus according to claim 8, further comprising:

a conveyor along which the first, second, and third printers are arranged and on which the medium is conveyed.

14. The image forming apparatus according to claim 13, further comprising:

a first sensor disposed along the conveyor for capturing an image of the medium being conveyed on the conveyor, wherein the processor is configured to determine, based on the captured image, a print area of the first, second, and third patterns.

15. The image forming apparatus according to claim 13, further comprising:

a second sensor disposed along the conveyor for detecting the medium being conveyed on the conveyor and outputting a signal when the medium is detected, wherein the processor is configured to determine when the first, second, and third printers are to print the first, second, and third patterns, based on the signal from the second sensor.

16. The image forming apparatus according to claim 8, further comprising:

first, second, and third supports extending vertically and to which the first, second, and third printers are attached in a movable manner.

17. A printing medium comprising:

a base;

a first symbol that is printed on the base, formed of a first material, and machine-readable and associated with first information; and a second symbol that is printed on the base and formed of a second material turning invisible when a first condition is satisfied, wherein a composite symbol of the first and second symbols is machine readable and associated with second information different from the first information, wherein the first symbol is readable by an information processing apparatus and causes the information processing apparatus to display the first information when read by the information processing apparatus, and the composite symbol is readable by the information processing apparatus and causes the information processing apparatus to display the second information when read by the information processing apparatus.

18. The printing medium according to claim 17, wherein the second material is decolored at a predetermined temperature, and the first condition is satisfied when a temperature of the second material reaches the predetermined temperature.

\* \* \* \* \*